UNITED STATES PATENT OFFICE.

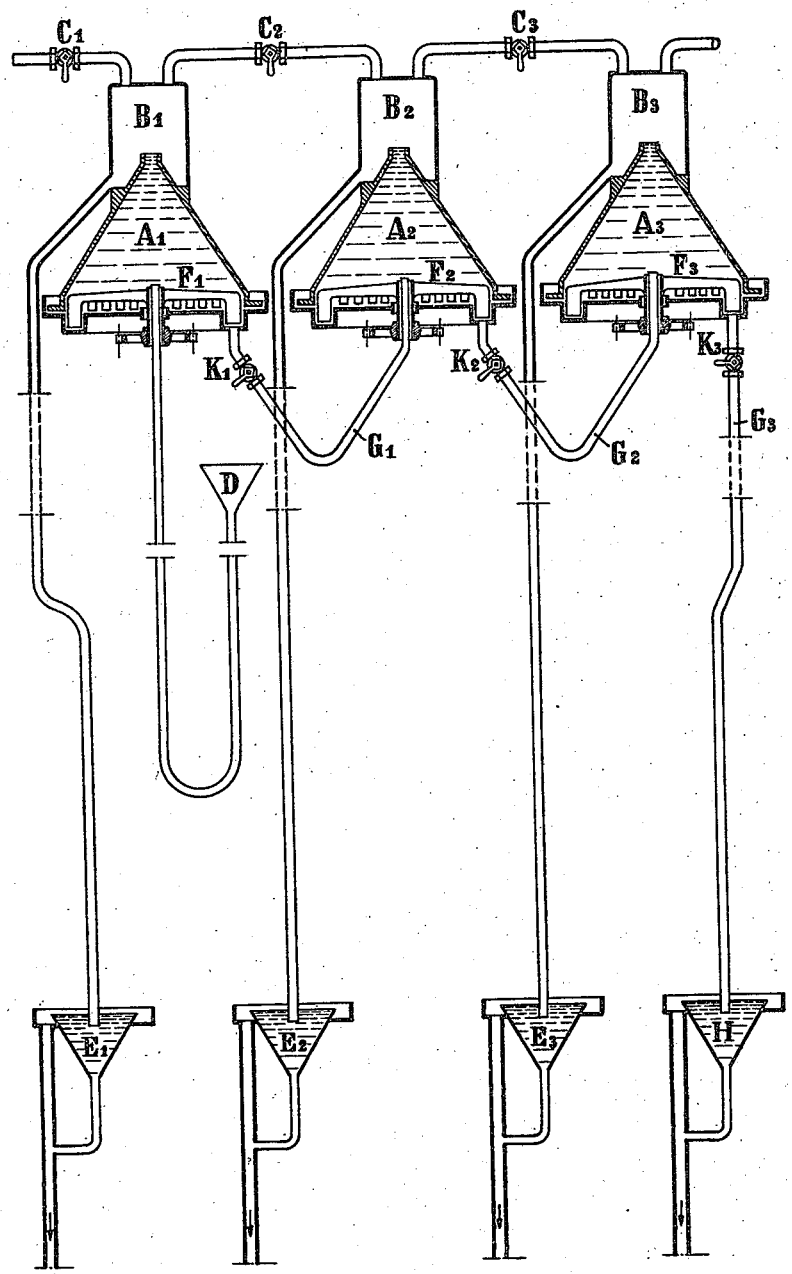

FRIEDRICH ARTHUR MAXIMILIAN SCHIECHEL, OF FRANKFORT-ON-THE-MAIN, GERMANY.

SEPARATING FINELY-DIVIDED ORE MIXTURES IN VACUUM SEPARATING VESSELS OR CHAMBERS.

1,212,566.

Specification of Letters Patent. Patented Jan. 16, 1917.

Application filed June 25, 1915. Serial No. 36,213.

*To all whom it may concern:*

Be it known that I, FRIEDRICH ARTHUR MAXIMILIAN SCHIECHEL, metallurgist, a subject of the Emperor of Austria-Hungary, and residing at Frankfort-on-the-Main, Germany, have invented certain new and useful Improvements in Separating Finely-Divided Ore Mixtures in Vacuum Separating Vessels or Chambers, of which the following is a specification.

This invention relates to the art of ore separation and involves the provision of a novel process and apparatus for treating ore pulp or a mass of finely divided ore and water, which has been previously mixed with another substance or with other substances (as different oils and acids), whereby the metalliferous constituents are quickly, economically and entirely separated from the other ingredients of the mixture; the invention also providing an equally novel apparatus for carrying out the process.

It is well known to subject such ore pulp to treatment in a vacuum chamber with a view to separating the substances influenced by oil, especially the metalliferous constituents such as sulfids, from the particles of ore not so influenced; as explained, for instance, in the German Patent No. 178,932. Owing to pre-treatment of the metalliferous bodies with oil and acids, the bodies take on an oily coating, admixed with microscopically fine air and gas bubbles. Such pre-treatment is desirable, because during separation these bubbles expand under the influence of the vacuum, thereby causing the adhering metalliferous substances to rise to the surface of the pulp in the vacuum chamber, the vacuum further acting to produce additional fine air, gas and water vapor bubbles which flock toward the oily bodies and favor their flotation toward the surface. In many cases, however, this process does not prove an economical success, inasmuch as sufficiently clean separation cannot be attained. This is so because when the pre-treated ore pulp is brought into a separation chamber with a practically perfect vacuum, such a strong and violent gas development takes place as to interfere with the whole separation process. Particles of the tailings are swirled up and overflow at the top with the floated concentrates, whereas the metalliferous bodies already raised are thrown to and fro on account of the exceedingly active ebullition at the surface of the liquid, the bubbles adhering to these bodies are destroyed, and the metalliferous bodies sink again to the bottom. Yet, on the other hand, a strong vacuum is necessary for causing all the metalliferous bodies to rise.

The present invention aims to disclose an improved method of and apparatus for securing proper separation of the metalliferous constituents of the pulp, and at the same time avoid the disadvantages previously observed. According to this process, the previously treated ore pulp is not submitted to a high vacuum at once, but the vacuum action is increased gradually by bringing the ore pulp successively into different separation chambers of gradually increased higher vacuum. Thereby in each chamber the formation of gas is substantially lessened, the lower vacuum in the immediately preceding chamber or chambers having eliminated such gases or air which would otherwise be detrimental in the presence of a higher vacuum as subsequently applied in accordance with the invention. In this way the vacuum may be increased to a practically perfect degree, complete separation of the metalliferous constituents being nevertheless attained.

The manner in which the process is conducted, as well as the construction of the improved apparatus, preferably used in carrying out the process, is to be seen from the accompanying drawing, which drawing is a more or less diagrammatic sectional elevation of the apparatus.

The air chambers or bells $B^1$, $B^2$ and $B^3$, of the separators $A^1$, $A^2$ and $A^3$ respectively, are interconnected by pipes as illustrated. Each pipe has interposed therein a regulating cock $C^1$, $C^2$ or $C^3$, one of the pipes being associated with a suitable pump or other vacuum-creating device (not shown). By adjusting the cocks, a predetermined vacuum may be maintained in each chamber. The cocks may be so adjusted that the vacuum in the chamber $A^2$ is higher than the vacuum in the chamber $A^1$, and the vacuum in the chamber $A^3$ is higher than the vacuum in the chamber $A^2$, if it is intended that the ore pulp shall first be introduced into the chamber $A^1$ to be there subjected to vacuum treatment, then transferred to the chamber $A^2$ for similar treatment, and then transferred to the chamber $A^3$ for similar treatment. For instance, the minus pressure in $B^3$ might well be kept at 750 mm. of mercury, in $B^2$ at 550 mm. and in $B^1$ at 400 mm.

A hopper D is provided for facilitating introduction of the ore pulp into the apparatus. Pre-treated pulp is fed into this hopper, and thence flows to the separation chamber $A^1$ through the connection illustrated. When the pulp in chamber $A^1$ is subjected to a vacuum part of the metalliferous constituents rise to the surface of the confined liquid, are drawn up into the bell $B^1$, and thence descend to the receiving hopper $E^1$ through the connection illustrated. The remaining metalliferous constituents in the pulp in chamber $A^1$, together with the tailings, are now transferred to the pipe $G^1$ by means of the rake $F^1$, and are drawn into the chamber $A^2$ by means of the higher vacuum in the chamber last mentioned and in its bell $B^2$. Here more metalliferous constituents rise to the surface of the pulp, are drawn up into the bell $B^2$, and thence descend to the receiving hopper $E^2$ through the connection illustrated. The metalliferous constituents remaining in the pulp, together with the tailings, are next transferred to pipe $G^2$ by means of the rake $F^2$, and are drawn into the chamber $A^3$ by means of the still higher vacuum in this chamber and in its bell $B^3$. The vacuum in chamber $A^3$ and in bell $B^3$ is practically perfect, so that after the collection of pulp in chamber $A^3$ has been subjected for a comparatively short time to the vacuum predetermined for that chamber, even the last separable traces of the metalliferous constituents of the pulp are eliminated; and these finally removed metalliferous constituents are discharged from the bell $B^3$ into the hopper $E^3$ by means of the connection illustrated, while the tailings pass from chamber $A^3$ into the receiving hopper H through the pipe $G^3$. Regulating valves $K^1$, $K^2$ and $K^3$, interposed respectively in pipes $G^1$, $G^2$ and $G^3$, are provided so that the passage of the pulp through the three separators may be controlled in such a way that the level of the pulp-liquid in each of the three chambers $A^1$, $A^2$ and $A^3$ always reaches the top of the chamber to cause part of the pulp-liquid, together with the concentrates, to overflow into the bell above the chamber.

It will be understood that pre-treatment of the ore pulp is not absolutely necessary for carrying out the process, as there are various minerals which may be caused to float without oiling them, such as, for instance, molybdenite, sulfur, and some chalcopyrites.

What I claim is:

1. The process of separating ore pulp, which includes subjecting a collection of such pulp to a vacuum sufficient to remove part of the metallic particles, and then subjecting the collection to another and higher vacuum to remove metallic particles remaining after the first removal.

2. The process of separating ore pulp, which includes subjecting a collection of such pulp to a vacuum sufficient to remove part of the metallic particles but insufficient to cause undesirable ebullition at the surface of the pulp-liquid, and then subjecting the collection to another and higher vacuum to remove metallic particles remaining after the first removal.

3. The process of separating pulp, which comprises subjecting the pulp to successive vacuum treatments, whereby each treatment withdraws part of the metallic bodies in the pulp, with each successively applied vacuum higher than the one immediately preceding, and at each treatment simultaneously withdrawing concentrates in the pulp, the withdrawn bodies being kept separated from the withdrawn concentrates during the carrying out of the process.

4. An apparatus for separating ore pulp, including, in combination, a plurality of separation chambers, each chamber being shaped as an upright cone with a discharge orifice at its top, a vacuum bell for each chamber overlying the same, conduits connecting the bells in series, a pressure pump associated with one of the conduits and directly serving one of the bells, conduits connecting the chambers in series, and valves in the conduits first mentioned independently adjustable to permit the pressure pump to establish different degrees of vacuum in the various bells.

5. An apparatus for separating ore pulp, including, in combination, a plurality of separation chambers, each chamber being shaped as an upright cone with a discharge orifice at its top, a vacuum bell for each chamber overlying the same, conduits connecting the bells in series, a pressure pump associated with one of the conduits and directly serving one of the bells, conduits connecting the chambers in series, and valves in these conduits and in the conduits first mentioned and operable to establish different degrees of vacuum in the various chambers and at the same time maintaining a desired liquid level in one of the chambers while permitting a flow of liquid from the chamber last mentioned to an adjacent chamber through one of the conduits last mentioned.

In testimony whereof, I affix my signature in presence of two witnesses.

FRIEDRICH ARTHUR MAXIMILIAN SCHIECHEL.

Witnesses:
  JEAN GRUND,
  CARL GRUND.